United States Patent [19]

Tanaka

[11] 4,118,067
[45] Oct. 3, 1978

[54] INERTIA-RESPONSIVE VEHICLE SEAT BACK LATCH MECHANISM

[75] Inventor: Akira Tanaka, Northridge, Calif.

[73] Assignee: American Safety Equipment Corporation, Encino, Calif.

[21] Appl. No.: 750,180

[22] Filed: Dec. 13, 1976

[51] Int. Cl.² ............................................. B60N 1/02
[52] U.S. Cl. .................................... 297/379; 297/216
[58] Field of Search ............... 297/216, 378, 379, 366; 16/146, 139; 292/DIG. 22

[56] References Cited

U.S. PATENT DOCUMENTS

| | | | |
|---|---|---|---|
| 3,549,202 | 12/1970 | Boschen et al. | 297/379 |
| 3,628,831 | 12/1971 | Close | 297/379 |
| 3,900,225 | 8/1975 | Wirtz et al. | 16/146 X |
| 3,972,564 | 8/1976 | Arlauskas et al. | 297/378 |
| 4,010,979 | 3/1977 | Fisher et al. | 297/379 |

*Primary Examiner*—Roy D. Frazier
*Assistant Examiner*—William E. Lyddane
*Attorney, Agent, or Firm*—Poms, Smith, Lande & Glenny

[57] ABSTRACT

An inertia-responsive vehicle seat back latch mechanism for a vehicle seat assembly having a seat back pivotally supported for forwardly tilting movement, wherein said latch mechanism includes a seat back stop for cooperating with an inertia-responsive member to prevent forward tilting of said seat back when said inertia-responsive member is in its seat back locking position. The inertia-responsive member is adapted for moving into the seat back locking position during a vehicle deceleration. The latch mechanism further includes a device for maintaining said inertia-responsive member in its seat back locking position subsequent to said vehicle deceleration. The seat back latch mechanism may also include a device for releasing said seat back from its locking position subsequent to said vehicle deceleration.

13 Claims, 9 Drawing Figures

U.S. Patent    Oct. 3, 1978    Sheet 1 of 4    4,118,067
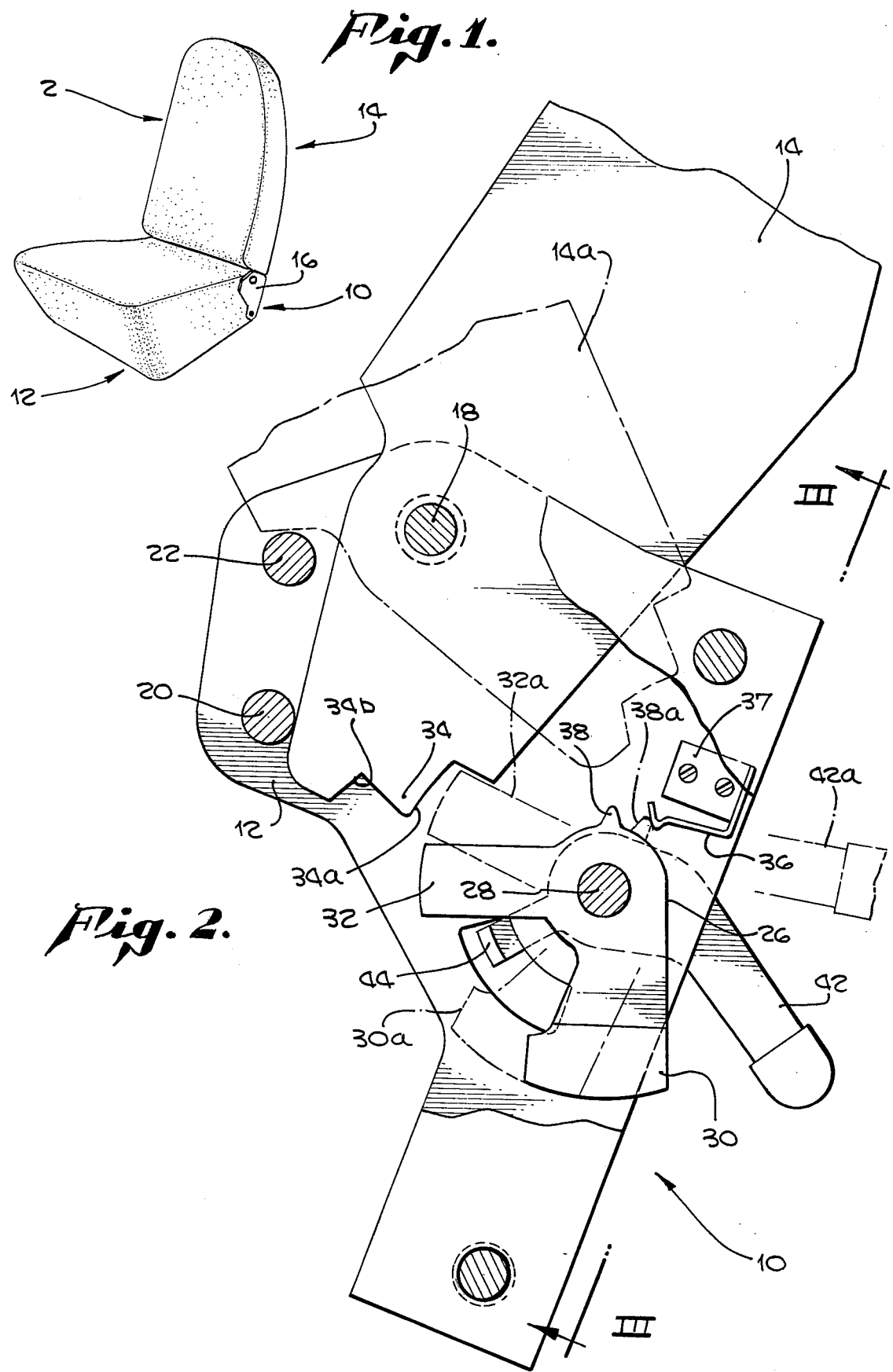

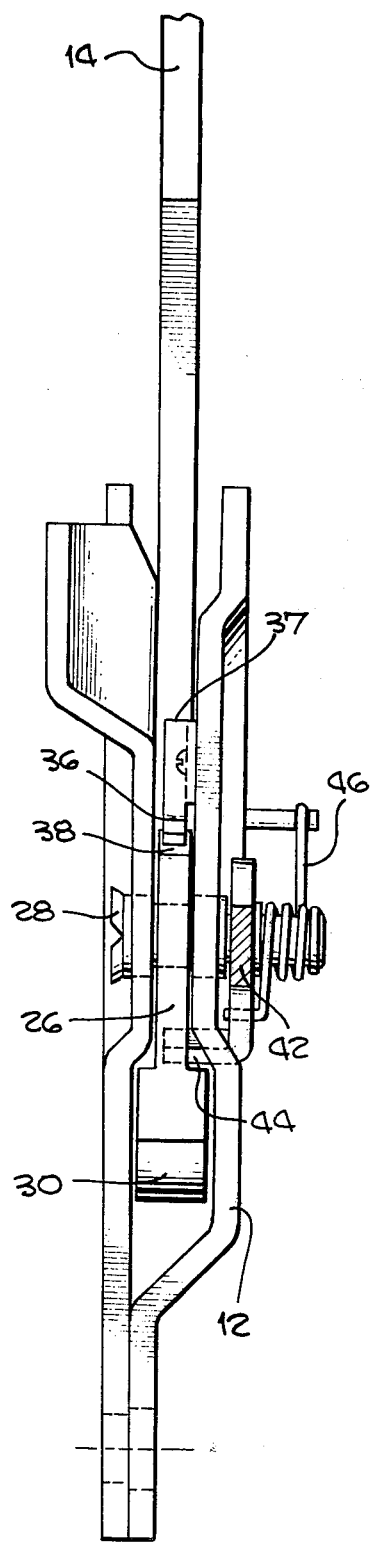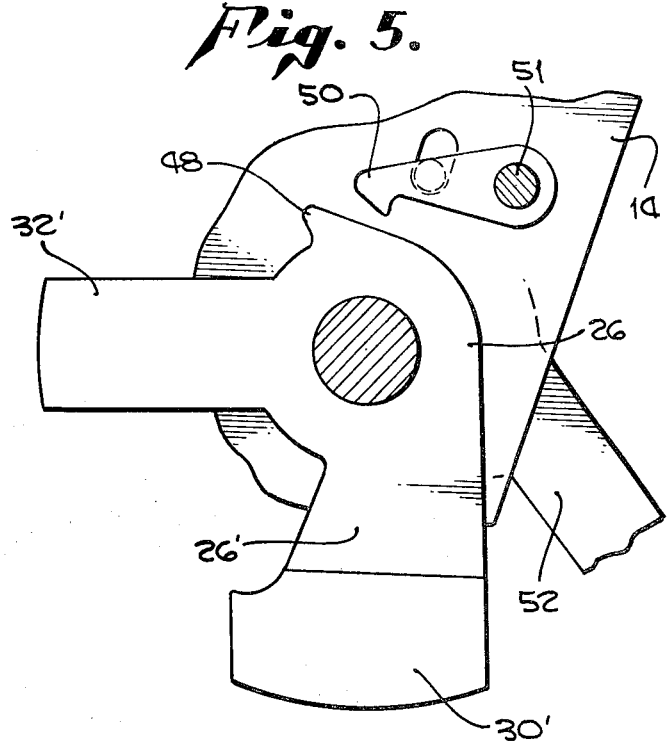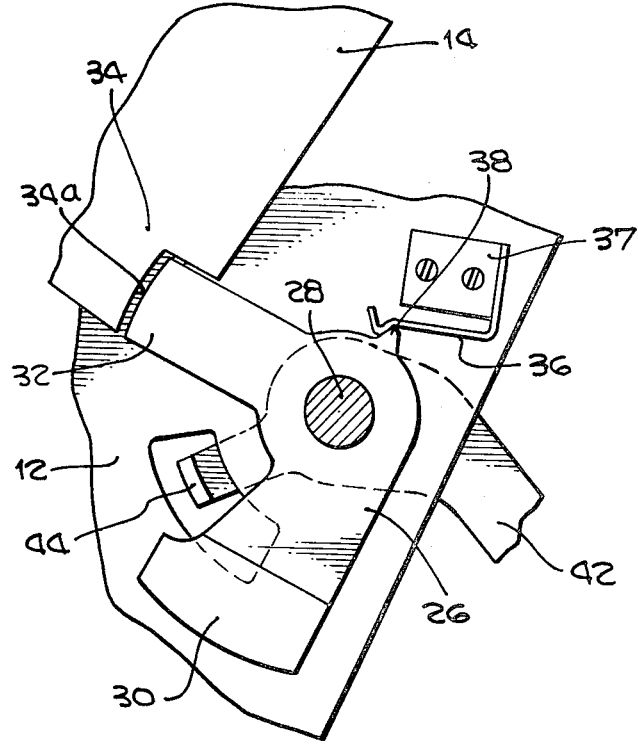

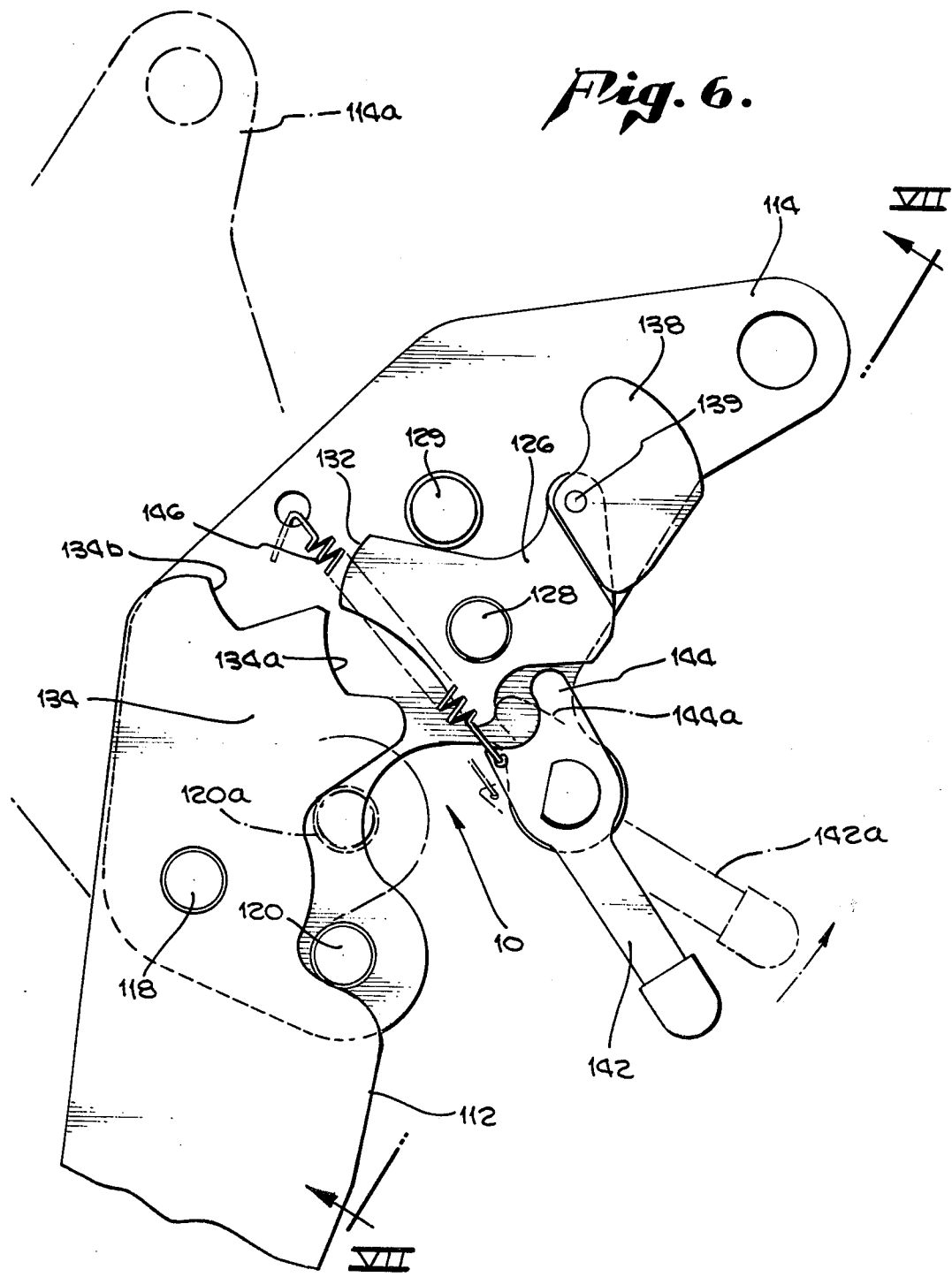

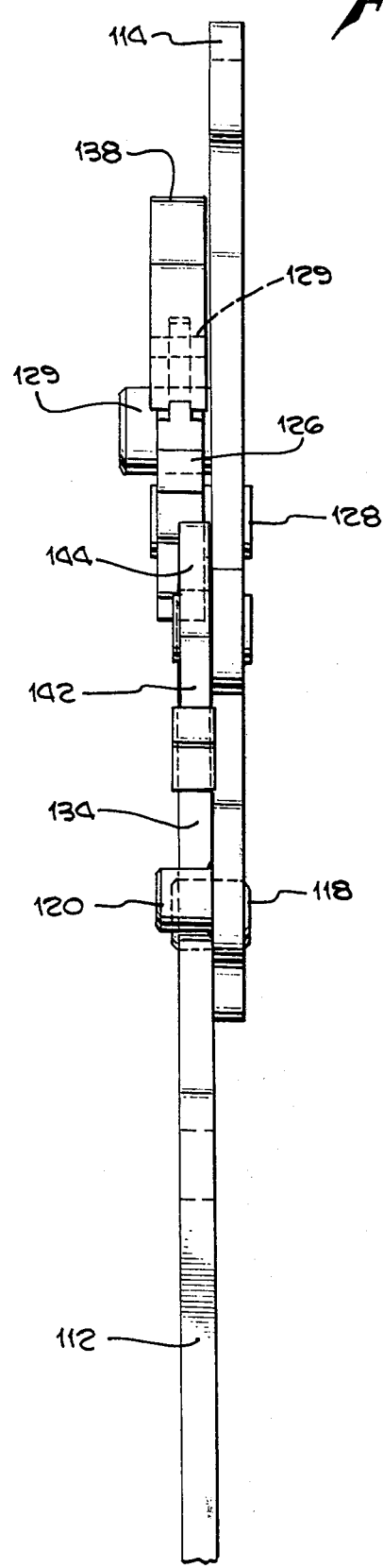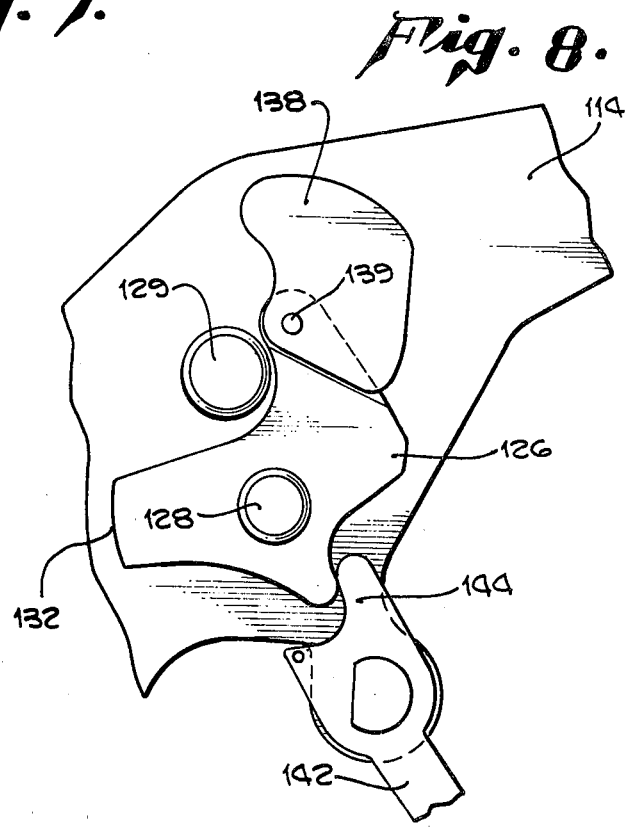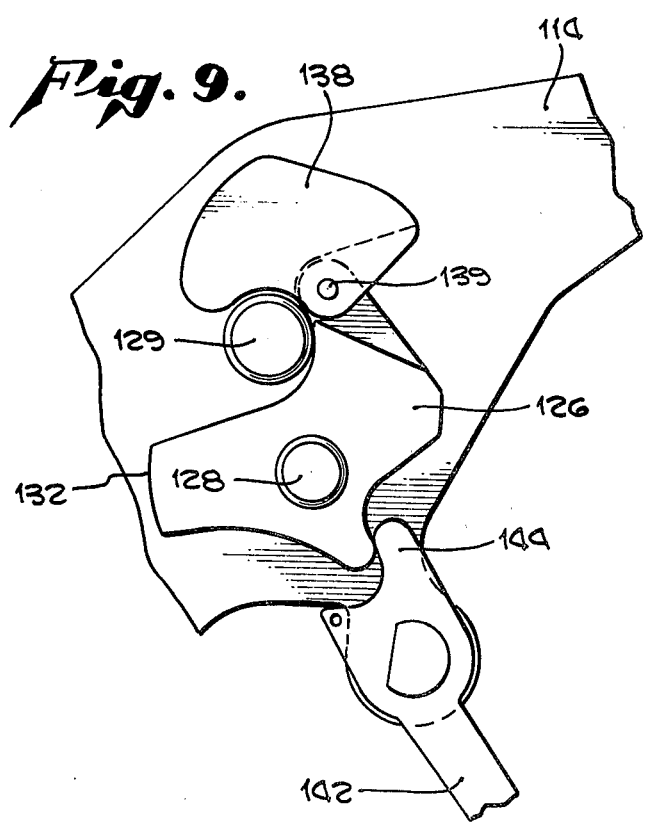

INERTIA-RESPONSIVE VEHICLE SEAT BACK LATCH MECHANISM

BACKGROUND OF THE INVENTION

1. Field of the Invention:

This invention relates to vehicle seat back latch mechanisms, and more particularly to inertia-responsive vehicle seat back latch mechanisms.

2. Description of the Prior Art:

The prior art discloses the exploitation of inertia and gravity to provide latching mechanisms for vehicle seat backs. However, none of these prior art mechanisms employs a means for maintaining the seat back in its locked condition subsequent to a vehicle deceleration.

While all prior inertia-responsive seat back latch mechanisms will lock a vehicle seat back and prevent it from tilting forward during a sudden deceleration, such as is experienced during a frontal crash, these mechanisms become inoperative when deceleration ceases. Because all seat backs will exhibit some flexibility during a frontal crash, the locked seat back will flex forward during the first stage of the crash, thereby absorbing energy. During the intermediate stage of the crash, the seat back will then flex back through its original upright position and back to a new flexed position. At this stage of the crash, the vehicle has stopped decelerating or is merely slowly decelerating. Now the seat back, in its back, flexed position, flies forward again, but because the vehicle is no longer decelerating, the latching mechanism will not activate and therefore will not prevent the seat back from tilting forward. This phenomenon is known as seat back rebound, and results in serious passenger injuries notwithstanding the presence of conventional seat back latch mechanisms.

It is therefore a primary object of this invention to provide a new inertia-responsive seat back latch mechanism, and to provide a seat back latch mechanism which will prevent seat back rebound.

It is also an object of this invention to provide a new inertia-responsive seat back latch mechanism which will maintain the seat back in a locked condition subsequent to a vehicle deceleration.

An other object of this invention is to provide a new inertia-responsive seat back latch mechanism which will maintain the seat back in a locked condition subsequent to a vehicle deceleration greater than a predetermined value.

Yet another object of this invention is to provide a new inertia-responsive seat back latch mechanism which will cause the seat back to be in a locked condition during a vehicle deceleration greater than a first predetermined value and maintain the seat back in a locked condition subsequent to a vehicle deceleration greater than a second predetermined value, which value is greater than the first predetermined value.

These and other objects and features of this invention will become apparent to those skilled in the art by reference to the following description and drawings.

SUMMARY OF THE INVENTION

Briefly, these and other objects of the invention are provided for by an inertia-responsive vehicle seat back latch mechanism for a vehicle seat assembly having a seat back pivotally supported for forwardly tilting movement, said latch mechanism locking said seat back in a locked condition during vehicle deceleration, wherein the latch mechanism includes a means for maintaining the seat back in its locked condition subsequent to said vehicle deceleration.

In one embodiment, this maintaining means is provided for by a latch mechanism including a seat back stop member attached to said seat back; an inertia-responsive means pivotally attached to said seat cushion support for rotating in response to a vehicle deceleration, said inertia-responsive means having a seat back locking member which moves into seat back locking position during a vehicle deceleration greater than a first predetermined value to cooperate with said seat back stop member to prevent the seat back from tilting forward; and means for maintaining said seat back locking member in its seat back locking position subsequent to a vehicle deceleration greater than a second predetermined value, which is greater than said first predetermined value.

In another embodiment of said invention, the latch mechanism comprises a seat back stop member integrally attached to said seat cushion support; inertia-responsive means pivotally attached to said seat back for rotating in response to a vehicle deceleration, said means having a seat back locking member which moves into seat back locking position during a vehicle deceleration greater than a first predetermined value to cooperate with said seat back stop member to prevent the seat from tilting forward; and means for maintaining said seat back locking member in its seat back locking position subsequent to a vehicle deceleration greater than a second predetermined value, which is greater than said first predetermined value. In this second embodiment, the means for maintaining said seat back locking member in its seat back locking position is provided for by an inertial mass pivotally attached to said inertia-responsive means, which inertial mass responds to a vehicle deceleration greater than said second predetermined value by rotating forward relative to said inertia-responsive means so as to then gravity bias said seat back stop member to maintain the seat back locking position.

All of the embodiments of this invention may include a means for releasing the maintaining means so that the seat back can be released from its locked position.

BRIEF DESCRIPTION OF THE DRAWINGS

FIG. 1 is a perspective view of a vehicle seat assembly;

FIG. 2 is a partial, side-elevational view showing one embodiment of the seat back latch mechanism of this invention, including various phantom positions;

FIG. 3 is a back-elevational view of the embodiment in FIG. 2 taken along the line III—III;

FIG. 4 is a partial, side-elevational view of the embodiment in FIG. 2 wherein the seat back is being maintained in a locked condition;

FIG. 5 is a partial, side-elevational view of a seat back latch mechanism having another embodiment for the means to maintain the seat back in a locked condition;

FIG. 6 is a partial, side-elevational view of an alternative embodiment of the seat back latch mechanism of this invention, including various phantom positions;

FIG. 7 is a back-elevational view of the embodiment in FIG. 6 taken along the line VII—VII;

FIG. 8 is a partial, side-elevational view of the embodiment in FIG. 6 showing the inertia-responsive member in the locking position; and FIG. 9 is a partial, side-elevational view of the embodiment in FIG. 6, wherein the seat back latch mechanism is being maintained in a locked condition.

DETAILED DESCRIPTION OF THE INVENTION:

Referring now to FIG. 1 of the drawings, there is shown a vehicle seat assembly 2, having a seat back 14 covered by upholstery and a seat cushion support 12, also covered by upholstery. There is also generally shown a seat back latch mechanism 10 having a cover plate 16. The seat back latch mechanism of this invention may be used on bucket seats as shown in FIG. 1, as well as with bench-type seats; and may be structurally positioned on the outer edges of a seat assembly or positioned in the middle section of a seat assembly. Referring now to both FIG. 1 and FIG. 2, seat back 4 is pivotally supported about the seat cushion support 12 by means of seat back pivot 18. Seat back 14 is adapted to normally be in a relatively vertical position, as shown in FIG. 1. Seat cushion support 12 is provided with a seat back stop 20 which prevents further backward tilting of seat back 14 by engaging a lower extremity surface of seat back 14, as shown in FIG. 2. There is also provided a second seat back stop 22 which limits the forward tilting of seat back 14 as shown by the phantom position 14a of seat back 14.

Attached to seat cushion support 12 is the seat back latch mechanism 10 which includes the inertia-responsive member 26 which pivots about pivot 28. Inertia-responsive member 26 is provided with a weighted portion 30 and a seat back locking member 32. Seat back 14 is also provided with a seat back stop portion 34 adapted for cooperation with seat back locking member 32. The inertia-responsive member is pivotally attached to seat cushion support 12 for rotation in response to a vehicle deceleration, said member having seat back locking member 32 which moves into a seat back locking position during a vehicle deceleration greater than a first predetermined value to cooperate with seat back stop portion 34 to prevent seat back 14 from tilting forward. Seat back stop portion 34 is provided with two stop surfaces 34a and 34b for cooperation with seat back locking member 32. If seat back 14 has tilted forward so that surface 34a has rotated too much to be able to engage seat back locking member 32, then stop surface 34b may still be able to engage seat back locking member 32 and thereby still lock the seat back.

For exemplary purposes only, the intertia-responsive member can be designed so that only in response to a vehicle deceleration greater than 0.5G will the seat back locking member rotate sufficiently to be in position to engage the seat back stop portion and thereby prevent the seat back from tilting forward. In other words during a vehicle deceleration less than 0.5G, the inertia-responsive member will not rotate sufficiently to lock the seat back.

Referring now to FIGS. 2 and 4, attached to seat cushion support 12 is a spring detent 36 which is mounted on the seat cushion support by mounting plate 37. Inertia-responsive member 26 is provided with a locking nipple 38 which is adapted to snap underneath and engage spring detent 36. Spring detent 36 and locking nipple 38 are adapted so that during a vehicle deceleration up to a predetermined second value, such as 5G, the locking nipple merely rotates into abutting relationship with spring detent 36 and does not become engaged by the spring detent. The position of inertia-responsive member 26 under this condition is shown in FIG. 2 by phantom lines 38a and 30a, representing the locking nipple 38 and the weighted portion 30 respectively. However, during a vechicle deceleration greater than 5G, locking nipple 38 rotates and snaps underneath the spring detent 36 and becomes lockingly engaged with the spring detent, as shown in FIG. 4. By becoming lockingly engaged with spring detent 36, inertia-responsive member 26 is maintained in the seat back locking position so that the seat back locking member 32 is maintained in cooperating position with seat back stop portion 34.

Seat back latch mechanism 10 is preferably provided with a release lever 42 which also pivots about pivot 28 and is spring biased in the clockwise direction. The release lever 42 is provided with a horizontally extending arm 44 which is adapted, upon lifting release lever 42, to move the inertia-responsive means 26 counterclockwise into its initial position, and released from engagement with spring detent 36. The arm 44 and release lever 42 move to the positions 44a and 42a when the release lever is operated.

Referring now to FIG. 3, the seat latch mechanism of FIG. 2 is seen from the back along the line III—III. As can be seen in FIG. 3, inertia-responsive member 26 rotates and pivots about pivot 28.

FIG. 5 illustrates an alternative embodiment to the locking nipple 38 and spring detent 36. In this embodiment there is provided a pawl catch 48 and pawl 50. Pawl 50 is pivotally attached to a seat back 14 at pivot 51 and may be either spring biased or gravity biased in a down direction. As in the embodiment in FIG. 2, the pawl catch 48 and pawl 50 are structurally designed so that during a vehicle deceleration up to a predetermined value, such as 5G, the pawl 50 does not engage pawl catch 48, but that during a vehicle deceleration greater than 5G, the inertia-responsive member rotates sufficiently that pawl 50 does engage pawl catch 48, and maintains the seat back locking member 32 in its locking position, and thereby maintains the seat back 14 locked. The embodiment of FIG. 5 also includes a release lever 52, but in this embodiment the release lever is adapted to move pawl catch 48 upwardly thereby releasing pawl 50 and allowing the inertia-responsive member 26 to rotate into its normal position.

FIG. 6 illustrates another embodiment 110 of the seat back latch mechanism of this invention. As in the first embodiment of the seat back latch mechanism, this embodiment also is associated with a seat back 114 and a seat cushion support 112, said seat back being pivotally supported about seat cushion support 112 by pivot 118, thereby allowing seat back 114 to tilt toward. Seat back 114 is normally in the position shown in FIG. 6 which places the seat back in a relatively vertical position. Seat back stop 120, integrally attached to seat back 114 abuts a portion of seat cushion support 112 to prevent further backward positioning of said seat back. Said seat back stop member 120 rotates with said seat back 114 and defines the full forward tilting movement of said seat back by its abutment with another portion of said seat cushion support, as shown by the phantom position 120a in FIG. 6.

The inertia-responsive member 126 of this embodiment is an inertial mass which is pivotally supported on seat back 114 by pivot 128. Seat back 114 is provided with a stop 129 which defines the limits of the rotational movements of inertia-responsive member 126. In FIG. 6, inertia-responsive member 126 is in its normal position and is prevented from further clockwise rotation by its abuttment with inertia-responsive member stop 129.

The inertia-responsive member 126 functions by rotating counterclockwise during vehicle deceleration so that seat back locking member 132 may move into seat back locking position and engage a seat back stop portion 134 which is integral with seat cushion support 112. It is preferable that the inertia-responsive member 126 be structurally designed so that it only rotates sufficiently to be in seat back locking position during a vehicle deceleration greater than some first predetermined value, such as greater than 0.5G. This will allow seat back 114 to be tilted forward freely during vehicle deceleration less than 0.5G.

As in the first embodiment, it is desirable to provide a means for maintaining the seat back locked subsequent to vehicle decelerations greater than a second predetermined value, such as 5.0G. In this embodiment, this means is provided for by inertial mass 138 which is pivotally attached to inertia-responsive member 126, as shown in FIG. 6. The center of gravity of inertial mass 138 is to the right of its pivot 139, thereby gravity-biasing inertial mass 138 into the position shown in FIG. 6. The combined center of gravity of inertia-responsive member 126 and inertial mass 138 is located to the right of pivot 128, thereby gravity-biasing the inertia-responsive member in the position shown in FIG. 6. During vehicle decelerations less than a first predetermined value, such as 0.5G, the inertia-responsive member and the inertial mass will rotate as a unit through a relatively small angle, an amount such that locking member 132 will not engage seat back stop portion 134, thereby allowing the seat back to tilt forward. Subsequent to such a vehicle deceleration the inertia-responsive member is gravity biased back to its normal position as shown in FIG. 6, due to the fact that the said combined center of gravity remains to the right of pivot 128.

Referring now to FIG. 8, during a vehicle deceleration greater than said first preselected value and up to a second preselected value such as 5.0G, the inertia-responsive member 126 and inertial mass 138 rotate as a unit a sufficient amount to position seat back locking member 132 to enable it to engage seat back stop portion 134 and lock seat back 114. The inertia-responsive member 126 and inertial mass 138 are so structured that when they move as an unit the combined center of gravity remains to the right of pivot 128 thereby causing the inertia-responsive member to return to its normal position as shown in FIG. 6, subsequent to said vehicle deceleration.

Referring to FIG. 9, during a vehicle deceleration greater than a second predetermined value, such as 5.0G, the inertia-responsive member 126 will again rotate so that seat back locking member 132 will be in seat back locking position so as to engage seat back stop portion 134; however because of the greater deceleration, inertial mass 138 will rotate forward relative to inertia-responsive member 126. Inertial mass 138 will rotate forward in such a manner that its center of gravity will now be positioned to the left of pivot 139, thereby gravity biasing inertial mass 138 into the position shown in FIG. 9. When inertial mass 138 is in the position shown in FIG. 9, the combined center of gravity of inertial mass 138 and inertia-responsive member 126 is now located to the left of pivot 128, thereby gravity biasing the inertia-responsive member to remain in the position shown in FIG. 9, which is the seat back locking position, thereby maintaining the seat back 114 locked subsequent to said vehicle deceleration.

The seat back latch mechanism of FIG. 6 is also provided with a release lever 142 which is spring biased by spring 146 in the position shown in FIG. 6. Release lever 142 has arm 144 which is adapted to move inertia-responsive member 126 from its seat back locking position to its normal position as shown in FIG. 6 by the lifting of release lever 142 as indicated by the arrow to position 142a (FIG. 6) and moving arm 144 to position 144a.

While there have been shown and described what is at present considered to be the preferred embodiments of the invention, it is obvious to those skilled in the art that various changes and modifications can be made therein without departing from the invention as defined by the appended claims.

I claim:

1. An inertia-responsive seat back latch mechanism adapted for operable connection to a vehicle seat assembly having a seat back pivotally supported for forwardly tilting movement, said latch mechanism having an inertia-responsive member which, responsive to a vehicle deceleration, is moved to a seat back locking position to prevent the seat back from tilting forward, wherein the improvement comprises:
    means adapted to be operably connected with the seat assembly for positively normally maintaining the inertia-responsive member in a continuously seat back locking position subsequent to the vehicle deceleration until manually unlocked.

2. The latch mechanism defined in claim 1 wherein said latch mechanism is adapted to only lock the seat back during a vehicle deceleration greater than a first predetermined value, and wherein said maintaining means maintains said inertia-responsive member in its seat back locking position in response to a vehicle deceleration greater than a second predetermined value, which value is greater than said first predetermined value.

3. An inertia-responsive seat back latch mechanism adapted for operable connection to a vehicle seat assembly having a seat cushion support, and a seat back pivotally supported for forwardly tilting movement, said latch mechanism comprising:
    seat back stopping means, operably associated with the seat assembly, for cooperating with inertia-responsive means to prevent forward tilting of the seat back when said inertia-responsive means is in its seat back locking position;
    inertia-responsive means, operably associated with the seat assembly, for moving into locking engagement with said seat back stopping means only in response to a vehicle deceleration, thereby defining the seat back locking position; and
    maintaining means, operably associated with said inertia-responsive means, for positively maintaining said inertia-responsive means in a continuously seat back locking position subsequent to the vehicle deceleration until manually unlocked.

4. The latch mechanism defined in claim 3 wherein said inertia-responsive means is pivotally attached to the vehicle seat assembly.

5. The latch mechanism defined in claim 3 wherein said maintaining means maintains said inertia-responsive means in seat back locking position only in response to vehicle deceleration greater than a predetermined value.

6. The latch mechanism defined in claim 3 wherein said inertia-responsive means moves into seat back locking position only during a vehicle deceleration greater than a first predetermined value, and said maintaining means maintains said inertia-responsive means in said seat back locking position only in response to a vehicle deceleration greater than a second predetermined value, which value is greater than said first predetermined value.

7. The latch mechanism defined in claim 3 further including means, operably associated with said maintaining means, for releasing said inertia-responsive means from said maintaining means so that the inertia-responsive means can move out of its seat back locking position.

8. An inertia-responsive seat back latch mechanism for a vehicle seat assembly having a seat cushion support, and a seat back pivotally supported for forwardly tilting movement, said latch mechanism comprising:
a seat back step member integrally attached to the seat back;
inertia-responsive means pivotally attached to the seat cushion support for pivoting in response to vehicle deceleration, said means having a seat back locking member which moves into seat back locking position only during a vehicle deceleration greater than a first predetermined value to cooperate with said seat back stop member to prevent the seat back from tilting forward; and
means operably connected to the seat cushion support for positively maintaining said seat back locking member continuously in its seat back locking position subsequent to a vehicle deceleration greater than a second predetermined value, which valve is greater than said first predetermined value, until manually unlocked.

9. The latch mechanism defined in claim 8 wherein said maintaining means comprises:
means integrally attached to said seat cushion support for engaging a locking means; and
locking means integrally attached to said inertia-resposive means and pivotable therewith for being engaged by said engaging means in response to a vehicle deceleration greater than said second predetermined value.

10. The latch mechanism defined in claim 9 including means operably associated with said maintaining means for releasing the engagement of said engaging means with said locking means.

11. An inertia-responsive seat back latch mechanism for a vehicle seat assembly having a seat cushion support, and a seat back pivotally supported for forwardly tilting movement, said latch mechanism comprising:
a seat back stop member integrally attached to the seat cushion support;
inertia-responsive means pivotally attached to the seat back for pivoting in response to vehicle deceleration, said means having a seat back locking member which moves into seat back locking position only during a vehicle deceleration greater than a first predetermined value to cooperate with said seat back stop member to prevent the seat back from tilting forward; and
means operably connected to the seat back for positively maintaining said seat back locking member continuously in its seat back locking position subsequent to a vehicle deceleration greater than a second predetermined value, which value is greater than said first predetermined value, until manually unlocked.

12. The latch mechanism defined in claim 11 wherein said maintaining means comprises an inertial mass pivotally attached to said inertia-responsive means and which responds to a vehicle deceleration greater than said second predetermined value by rotating forward relative to said inertia-responsive means, and which then gravity biases the seat back locking member to remain in its seat back locking position.

13. The latch mechanism defined in claim 11, further including means, operably associated with said maintaining means, for overcoming said maintaining means and for moving the seat back locking member out of its seat back locking position.

* * * * *

UNITED STATES PATENT AND TRADEMARK OFFICE
CERTIFICATE OF CORRECTION

PATENT NO. : 4,118,067
DATED : October 3, 1978
INVENTOR(S) : Akira Tanaka

It is certified that error appears in the above–identified patent and that said Letters Patent are hereby corrected as shown below:

Claim 1, line 28, delete "normally".

Claim 8, line 35, delete "valve" and insert -- value --.

Signed and Sealed this

Twentieth Day of February 1979

[SEAL]

Attest:

RUTH C. MASON
Attesting Officer

DONALD W. BANNER
Commissioner of Patents and Trademarks